United States Patent [19]
Warren

[11] 4,071,706
[45] Jan. 31, 1978

[54] DATA PACKETS DISTRIBUTION LOOP

[75] Inventor: Charles Stewart Warren, Southbourgh, Mass.

[73] Assignee: RCA Corporation, New York, N.Y.

[21] Appl. No.: 722,583

[22] Filed: Sept. 13, 1976

[51] Int. Cl.² .............................................. H04J 3/06
[52] U.S. Cl. ............................ 179/15 AL; 179/15 BS
[58] Field of Search ......... 179/15 AL, 15 AF, 15 BS; 178/69.5 R

[56] References Cited

U.S. PATENT DOCUMENTS

| | | | |
|---|---|---|---|
| 3,093,815 | 6/1963 | Karnaugh | 179/15 AF X |
| 3,603,932 | 9/1971 | Kerr | 179/15 AL |
| 3,681,759 | 8/1972 | Hill | 179/15 AL |
| 3,692,941 | 7/1972 | Collins | 179/15 AL |
| 3,732,374 | 5/1973 | Rocher | 179/15 AL |
| 3,919,484 | 11/1975 | Maxemchuk | 179/15 AL |
| 3,985,963 | 10/1976 | Boutmy | 179/15 AF |

Primary Examiner—David L. Stewart
Attorney, Agent, or Firm—H. Christoffersen; Samuel Cohen; Carl V. Olson

[57] ABSTRACT

A data communications or distribution loop has a plurality of computer stations each of which introduces a delay while it examines the header of each circulating packet or block of data. An elastic synchronizing buffer, including a random-access memory, is included in the loop to introduce a delay which, when added to the delays introduced by the stations, equals the period of a packet. The delay introduced by the buffer is automatically adjusted as stations are added to, or removed from, the loop.

10 Claims, 5 Drawing Figures

DATA PACKETS DISTRIBUTION LOOP

The increased availability of mini-computers having improved computational power has resulted in the use of a number of mini-computers at spaced locations to do tasks that previously would have been performed by one large computer. This has given rise to the need for communications systems permitting rapid communication of data from any one of a large number of mini-computers to any other one of the mini-computers. For this purpose, a loop bus has advantages over a more conventional line bus. One type of loop provides message channels which are time multiplexed on a bit basis in a respective sequence as described in U.S. Pat. No. 3,879,582, issued to H. E. White, et al on Apr. 22, 1975.

Another type of loop bus arrangement is one in which packets or blocks of data bit times are continuously circulated around the loop, as described in the article "Network for Block Switching of Data" by J. R. Pierce appearing in the July-Aug. 1972 issue of the Bell System Technical Journal, pages 1133 - 1145.

In a data packet loop system, any computer station in the loop may fill a received empty packet of bit times with data and send it along to any other computer station in the loop by inserting the address of the destination station in the header space of the packet. All stations in the loop examine headers of received packets to see if the packet should be accepted or passed on around the loop. This examination of the headers introduces a delay in the movement of each packet around the loop, because the serially-received bits must be accumulated in a shift register and decoded before the forwarding of the same or different address bits can be accomplished. Because these "header delays" in all the stations in the loop normally do not exactly add up to the time period of one packet, (or a multiple thereof) some synchronizing means must be provided to prevent the beginning of a packet from entering a point on the loop before the end of the same or a different packet has left that point on the loop.

In a system embodying the invention, a data packet loop bus having a large number of computer stations is provided with a synchronizing station including a random-access memory operated as an elastic buffer. The buffer automatically introduces an amount of delay to synchronize the circulation and recirculation of packets in the loop.

Figure 1:
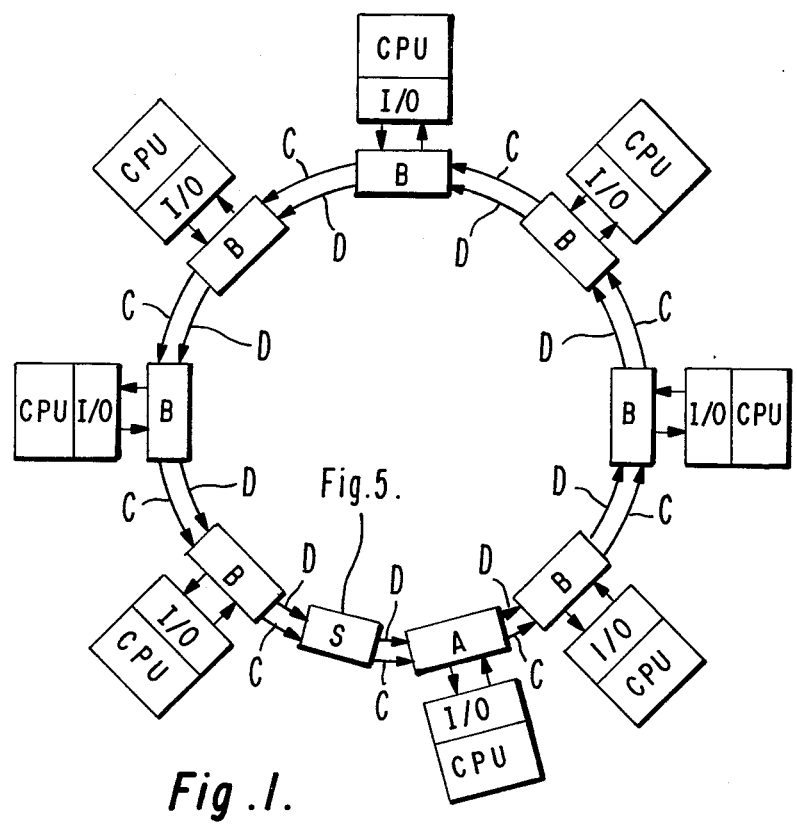
FIG. 1 is a block diagram of data loop including eight exemplary computer stations and a synchronizing station.

FIG. 1 shows a data loop for data interchanges between eight computers, designated CPU for central processor unit. The loop may include a much larger number, such as 200, of computers, or mini-computers, located in an area, for example, of one square kilometer. Each computer CPU is connected through an input/output unit I/O to a bus station B, except one master or controlling computer CPU which is connected through an input/output unit to a bus station A. The bus stations A and B are connected serially in a loop by signal paths which may consist of a twisted pair of conductors C for a clock signal and a twisted pair of conductors D for data signals. The loop also includes a synchronization station S, discussed later.

Figure 2:
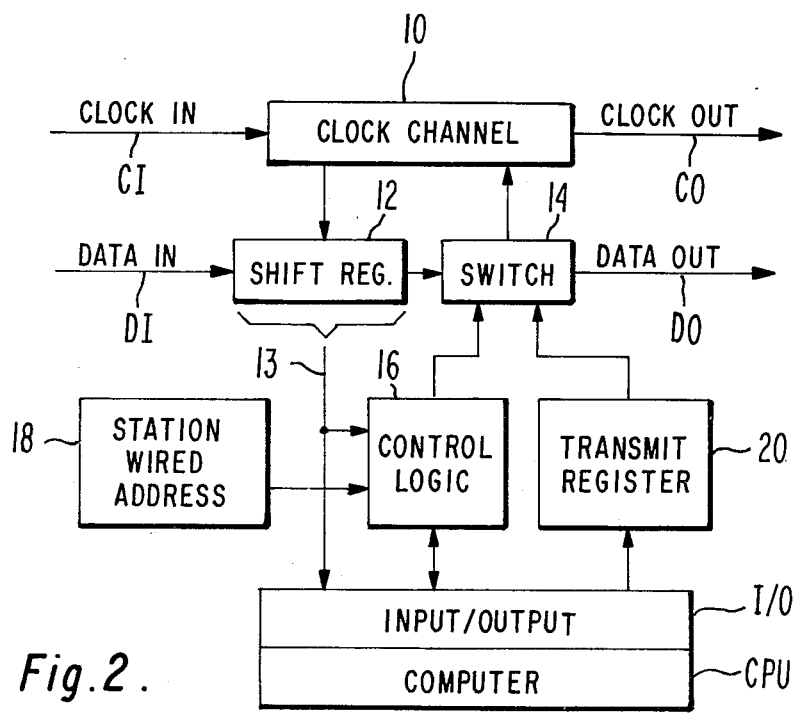
FIG. 2 is a block diagram of one of the computer stations shown in the system of FIG. 1.

FIG. 2 shows a single station on a packet-handling loop. Clock input signals received on a line CI are applied through a clock channel 10 to a clock-out line CO. Data-in signals received on a line DI are coupled serially through a shift register 12 and a switch 14 to a data-out line DO. The shift register 12 is also arranged to accumulate the bits of a packet header and transfer them all in parallel over multi-conductor path 13 to control logic 16 and through a computer input/output unit I/O to a computer CPU. A station wired address 18 provides a local address to the control logic 16 for comparison with the destination address portion of a packet header to determine whether a received packet should be transferred to the local computer CPU, or forwarded through switch 14 and on around the loop. A transmit register 20 receives header and data information from the computer CPU in bit-parallel fashion and transmits the bits out in bit-serial fashion through switch 14 to the data-out line DO. FIG. 2 describes both the A and B stations in FIG. 1. The A station differs from the B stations in including means for additional control functions in its control logic 16.

Figure 3:
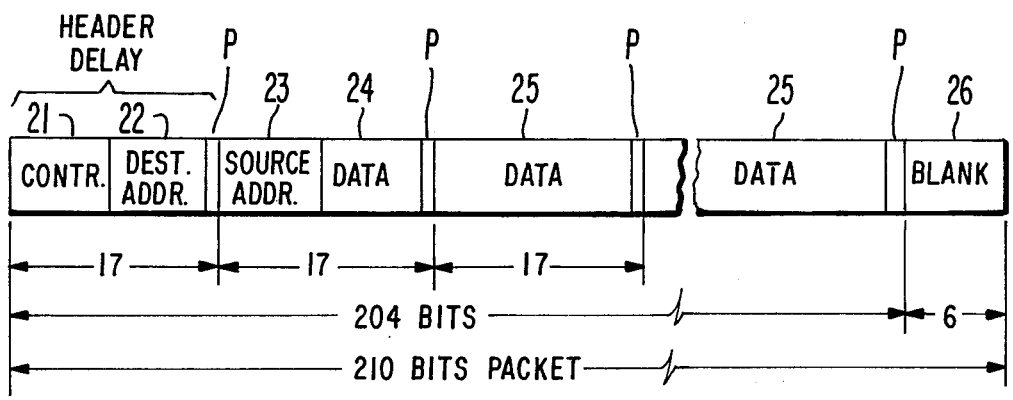
FIG. 3 is a diagram of an exemplary packet of information bits.

Each station as shown in FIG. 2 delays the serially-received data by accumulating the header bits of the packet in shift register 12. FIG. 3 shows an example of a packet of 210 bits. The packet has a header including 8 control bits 21, 8 destination address bits 22 and one parity bit P. Next are 8 source address bits 23, 8 data bits 24 and one parity bit P. There follows 10 16-bit data words 25 each followed by a parity bit P. Finally there are 6 blank all-zero guard bits 26 at the end of the packet. The eight control bits 21 may be used to indicate packet empty/full, unclaimed message, hog prevention, public/private distribution, B station error and A station error.

Figure 4:
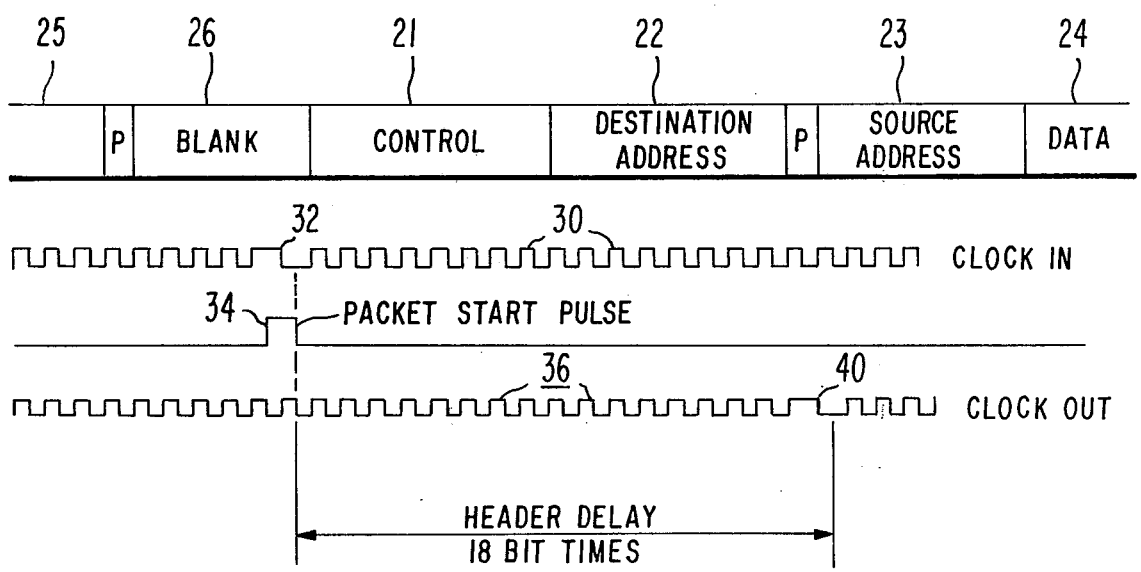
FIG. 4 is a diagram of synchronizing pulses near the header in of the packet shown in FIG. 3.

FIG. 4, drawn at twice the scale of FIG. 3, shows the bits at the end of one packet and the beginning of a following packet, all in relation to a clock-in pulse wave 30 having a phase reversal at 32 to mark the beginning of a packet. The phase reversal at 32 is detected by a phase detector in Clock channel 10 (FIG. 2) to produce a packet-start pulse 34 used for packet framing purposes in the station.

The header bits 21 and 22 following the packet-start pulse are accumulated in the shift register 12 (FIG. 2) and are examined in parallel in control logic 16. During this time interval, which is illustrated as a header delay lasting 18 bit times, no bits are being transmitted from the A or B station to the next station in the loop. The end of the header delay period is determined in the clock channel 10 by counting 18 clock pulses and modulating the output clock pulse wave 36 (FIG. 4) with a phase reversal at 40 to mark the beginning of a packet supplied to the next station. After the occurrence of the packet-start signal 40, the entire packet, starting with the first bit of the control byte 21, is transmitted to the next station on the loop. The contents of the control byte 21 and the destination address byte 22 which are transmitted may be the same as received, or may be different as the result of action taken by the control logic 16 and the computer CPU.

Each A or B station (FIG. 1) through which a packet passes causes an additional 18-bit header delay. If there are eight stations in the loop, as illustrated in FIG. 1, the header delays add up to 18 times 8 or 144 bit times. This is fewer than the 210 bit times of a packet in the illustrative system being described. Therefore, ignoring the relatively short signal propagation delays between stations, the first bit of a packet will go around the loop and arrive at the station where it started before the 145th bit of the packet has left the station where the packet started. To avoid a loss of overlapping information bits, an additional delay of 210−144=66 bit times must be added in the loop to synchronize the loop, so that the beginning of a packet arrives at a station immediately after the last bit of a packet leaves the station. This additional delay of 66 bit times is provided by a synchronizer S shown in the loop FIG. 1 at the input to the one A station, and shown in detail in FIG. 5. The synchronizer S may alternatively be located anywhere else in the loop. When a station is added to the loop, or removed from the loop, the delay provided by the synchronizer S is automatically reduced by 18 bit times, or increased by 18 bit times, respectively.

Figure 5:
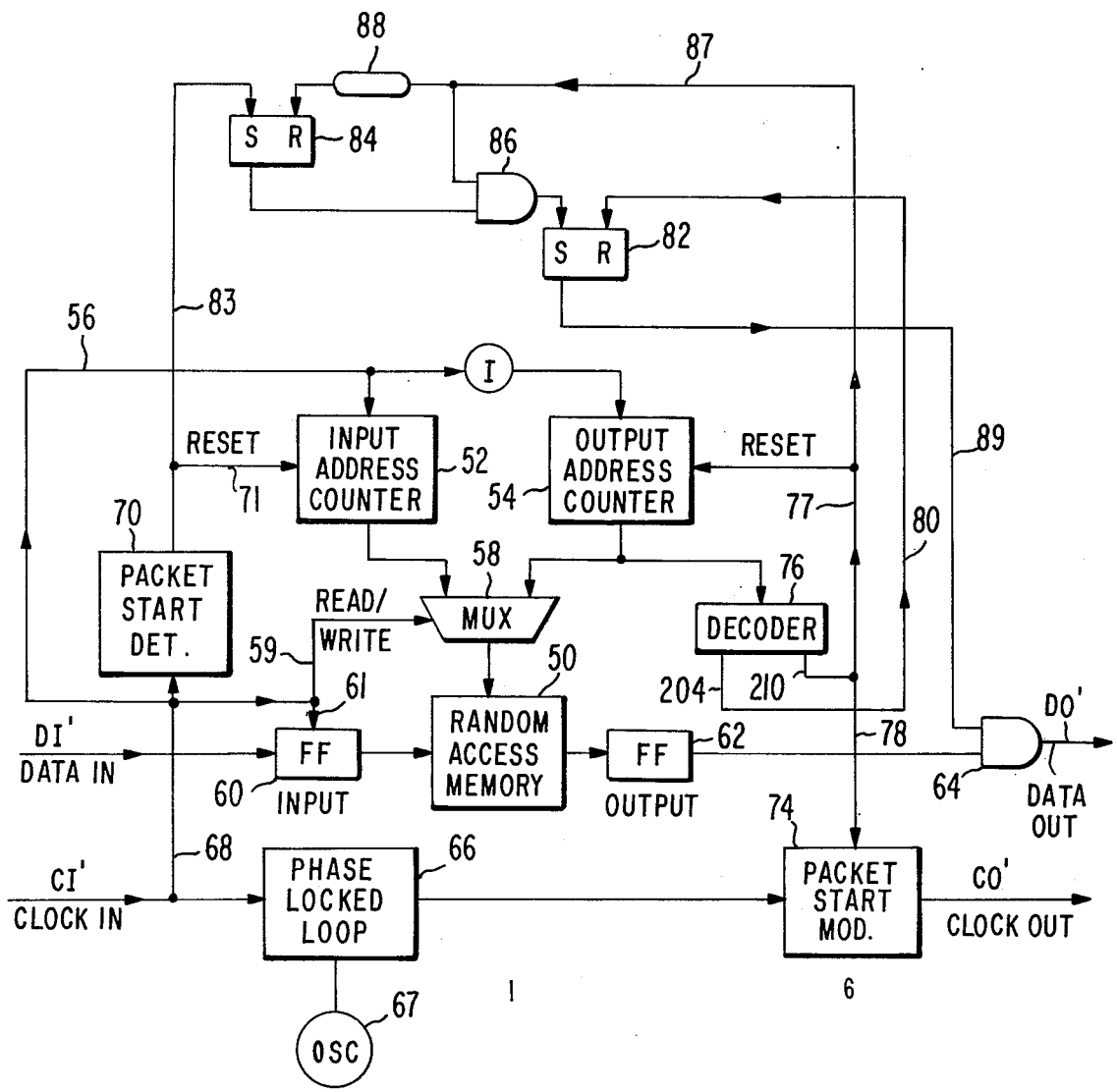
FIG. 5 is a block diagram of a synchronizing station included in the system of FIG. 1.

The synchronizer station S shown in FIG. 5 includes a random access memory 50 having storage locations for at least as many bits as are in the packet, or 210 in the present example. The bit storage locations in the memory may be sequentially addressed by an input address counter 52 during a write cycle, and may be sequentially addressed by an output address counter 54 during a read cycle. The input address counter 52 is incremented over line 56 during one-half cycle of the clock signal received on the clock-in line CI', and the output address counter 54 is incremented from inverter I during the other half cycle of the clock signal on line 56. Outputs are alternatively taken from the input and output address counters for application to the memory 50 by a multiplexer 58 operating under control of a clock signal received over line 59.

The bits of a packet received on data-in line DI' are applied through an input flip-flop 60 to the memory 50 under control of a clocking pulse received over line 61. Bits of a packet read out from memory 50 are applied through an output flip-flop 62 and through an output "and" gate 64 to a data-out line DO'.

The synchronizer station shown in FIG. 5 has a clock channel which, like the clock channel 10 in FIG. 2, includes a phase locked loop 66 and a voltage-controlled oscillator 67 by which the received clock wave 30 (FIG. 4) is reconstituted without the packet start phase reversal 32. The oscillator 67, or the corresponding oscillator in the A station, preferably should be a crystal controlled oscillator acting as a master oscillator to establish the clock frequency of the entire loop. The clock-in signal 30 is applied over line 68 to a packet-start detector 70, which phase detects the phase-reversal packet-start signal 32, and generates a packet-start signal 34. The packet-start signal 34 is applied over line 71 as a reset signal to the input address counter 52.

The clock channel in the synchronizer of FIG. 5 also includes a packet-start modulator 74 which receives a reconstituted clock wave from phase locked loop 66, and modulates the clock wave with a phase reversal which reconstitutes the received packet-start phase reversal at a time independent of the time of arrival of the input packet-start phase reversal 32. The packet-start signal is generated every time the output address counter 54 reaches a count of 210 (the packet length) and is reset to zero. A decoder 76 decodes the count of 210 in the counter 54 and acts over line 77 to reset the counter 54 and acts over line 78 to pass a pulse to the packet-start modulator 74 to produce the packet-start phase reversal in the clock-out signal on line CO'. The output address counter continuously cycles through the counts of zero through 210 without interruption.

The decoder 76 also produces an output at every count of 204 in counter 54, which output is applied over line 80 to the reset input R of a flip-flop 82. The true output of the flip-flop is applied over line 83 to enable the output "and" gate 64.

The output of the packet-start detector 70 is applied over line 83 to the set input S of a "buffer-occupied" flip-flop 84. The true output of flip-flop 84 is applied through "and" gate 86 to the set input S of the flip-flop 82. The gate 86 is enabled by a count-of-210 output over lines 87 and 77 from the decoder 76. The count-of-210 signal is also applied through a short delay device 88 to the reset input R of the flip-flop 84.

In the operation of the synchronizer staton shown in FIG. 5, the output address counter 54 is continuously incremented by a clock signal received through inverter I, and is reset to zero by decoder 76 every time the count in the counter reaches the number 210 representing the number of bit times in each packet. The output address counter 54 thus causes the repeated sequential readout of the contents of the 210 bit storage locations in the memory 50, regardless of whether or not the storage locations contain information.

The writing of received information bits into sequential bit storage location of memory 50 is controlled by the input address counter which is reset to zero only when a packet-start signal is received from the packet-start detector 70. Thereafter, received information bits are written into successive storage locations in memory 50 until the input address counter reaches the packet-length-count of 210. Thereafter, the input address counter remains at a count of 210 until it is reset by the next received packet-start signals.

In the example being described where there are eight A and B stations in the loop producing header delays of $8 \times 18 = 144$ bit times, the output address counter 54 has a count of 144 when the packet-start signal comes around the loop and is detected in packet-start detector 70 causing the input address counter to be reset to zero and to start counting. Therefore, the count in output address counter 54 is 144 when the count in input address counter 52 is zero. When the count in the output counter reaches 210 and is reset to zero, the count in the input counter is 210−144=66. The output counter is thus always 66 counts behind the count in the input counter. In other words, each received information bit is read out of memory 50 at 66 bit times or clock pulses after it is written into the memory. Each bit is stored in memory 50 for 66 bit times, and this delay when added to the delay of 144 bit times introduced by the eight A and B stations insures that the last bit of a packet will leave any given point in the loop just before the first bit of a packet arrives at the point.

At the time that the last or 210th bit of a packet is read out of memory 50 and transmitted, the 210-count output of decoder 76 is applied over line 78 to the packet-start modulator 74. The modulator causes a packet-start phase reversal in a cycle of the clock signal transmitted on clockout line CO'. In this way, a packet-start signal is always provided in the transmitted clock signal at the start of all packets transmitted on the data-out line DO'.

The described synchronized condition of the loop is automatically maintained when B stations are added to the loop or removed from the loop. This is accomplished by the circuit including the "buffer occupied" flip-flop 84 which is set every time a packet-start signal is received from detector 70.

The data-output "and" gate 64 is normally enabled to transmit data by a true output over line 89 from the flip-flop 82. When the last 204th bit of a 210-bit packet is read out of memory 50 and transmitted, the 204-count output of decoder 76 is applied over line 80 to reset the flip-flop 82. The output of flip-flop 82, when reset, inhibits output gate 64 and causes the transmission of binary zeroes only during the six packet bit times of the blank guard portion 26 (FIG. 3) of the packet.

When the 210th bit of the 210-bit packet is transmitted, the 210-count output of decoder 76 is applied over lines 77 and 87 to output "and" gate 64. This ends the blank guard portion 26 and enables the gate to pass the control byte 21 at the beginning of the packet.

The 210-count output of decoder 76 is also applied through a short-delay device 88 to the reset input of "buffer-occupied" flip-flop 84, so that the flip-flop 84 will always be reset at the beginning of a transmitted packet. At any time during transmission of the packet, the synchronizer may receive the start of the same or another packet with the result that a packet-start signal from detector 70 sets "buffer-occupied" flip-flop 84. Then, at the end of the transmitted packet, the 210-count signal enables gate 86 to pass the output of flip-flop 84 to set flip-flop 82 and enable output gate 64 to pass data in the bit times of the next transmitted packet.

On the other hand, if no packet-start signal was received during transmission of the packet the "buffer-occupied" flip-flop 84 remains reset to indicate that the memory 50 is empty of data. As a result, at count 210, flip-flop 82 remains reset and output "and" gate 64 remains inhibited. Thus, the following transmitted bit times are all zeroes, including the initial control byte 21 in the packet header. All A and B stations in the loop recognize an all-zero control byte to represent an empty packet having contents which should be ignored. In this way it is guaranteed that standard packets will always be injected into the loop. Continued operation is insured even if a transient error elsewhere in the loop results in a lost packet-start signal. The arrangement also provides the initial packets when the loop is first put into operation.

The same buffer output logic automatically compensates for transients created when receiving stations are removed from the loop. Since the incoming clock and the outgoing clock are at the same rate, the data rate on the input must be exactly equal to the outgoing data rate. Therefore, under normal conditions the buffer memory 50 could never get empty so long as the memory is large enough to hold one packet's length of data. So, under normal conditions the incoming address counter and the output address counter will differ by a constant. The counter difference represents the delay in the variable-delay buffer and provides the added delay necessary to make the complete loop equal to a multiple number of packets.

Removing a station from the loop results in a reduction in the total loop delay and also results in a short packet, since at the moment the station is removed, the packet that is currently passing through the station will be shortened by the length of the packet header (i.e. 18 bits). The B station logic should be designed so that this switchover is done only during a blank header, so that useful data will not be destroyed. Once the short packet reaches the variable delay buffer or synchronizer, the input counter will automatically be reset by the packet-start signal occurring earlier than normal. Since the output address counter continues to output full packets, the difference in the two counters will increase by exactly the number of bit delays (18) represented by the removed station.

There is, however, one special case. Suppose the delay represented by the removed station is sufficient to force the buffer length to exceed the length of one packet. If, for example, the Nth packet is the short packet, and if the buffer is outputting the last few bits of the (N−1) packet, then the input counter will be reset before the output logic even starts to output the Nth packet. When the output logic starts to transmit the next packet, the (N+1) packet will be coming into the buffer and the Nth packet will have been lost. If the packet was an empty packet then there has been no data lost and the loop has become one packet shorter. This, of course, is exactly what is desired.

Now consider what happens when a new receiving station is added to the loop. Here it is desired to switch the station into the loop just prior to the sync signal of any packet. When this is done the packet immediately preceding the sync will be lengthened by the 18 bit delay's in the station. When this longer packet reaches the variable delay buffer the incoming buffer reset is delayed by the extra bits, causing the output buffer to catch up by the same amount. This reduces the delay in the buffer and automatically keeps the total delay in the loop constant.

There is the special case in which the added station delay causes the total loop delay to accommodate one more packet. This comes about if the output counter is only a few bits behind the input counter when the long packet enters the buffer. The output counter reaches its full count before the input counter is reset by the incoming packet-start signal. Since the special "buffer-occupied" control gets reset by the 210th count and has not been set by the incoming packet-start signal, the output logic automatically generates an empty header and sends out an additional packet. This of course means there is one more packet circulating in the loop, as desired.

While the invention has been described in terms of specific example, it will be understood that this has been done for purposes of clarity of explanation, and that the invention is not limited thereby.

What is claimed is:

1. A synchronizer for inclusion in a data communications system loop in which packets of N information bits circulate together with clock pulses and packet-start pulses in a loop having S stations each of which introduces a delay corresponding with the time of $n$ clock pulses, comprising a random access memory, an input address counter means counting to N, incremented by each clock pulse and reset by each packet-start pulse, to store successive information bits in successive memory locations, and an output address counter means, incremented by each clock pulse and reset upon reaching a count equal to the number N of bits in the packet, to read out information bits successively from successive memory locations, whereby the contents of said address counters differ by an amount $d$ so that the memory introduces a delay equal to $d$ clock pulses, which, when added to the number $n$ times S of clock pulse delays introduced by the S stations connected in the loop, is an integral multiple, including unity, of the number of N of bits in each packet.

2. A synchronizer according to claim 1 including means operative upon each said resetting of said output address counter to transmit a packet-start pulse.

3. A synchronizer according to claim 1 including means operative upon each said resetting of said output address counter, if no packet-start pulse was received since the last resetting of the counter, to transmit an empty packet.

4. A synchronizer according to claim 1 including means operative upon each setting of said output address counter, if no packet-start pulse was received since the last resetting of the counter, to transmit a packet header signifying that the packet is empty.

5. A synchronizer according to claim 1 including means operative between two predetermined counts of said output address counter to transmit guard bits between information bits of successive packets.

6. A data loop communications system, comprising a plurality of stations connected in a loop through which packets of information bits circulate together with clock pulses and packet-start pulses, each of said stations introducing a delay, and
 a synchronizer connected in the communications system loop and including
 a random access memory
 an input address counter means counting to N, incremented by each clock pulse and reset by each packet start pulse, to store successive information bits in successive memory locations, and
 an output address counter means, incremented by each clock pulse and reset upon reaching a count equal to the number of bits in the packet, to read out information bits successively from successive memory locations,
 whereby the contents of said address counters differ by an amount such that the memory introduces a delay, which, when added to the delays introduced by the stations connected in the loop, is an integral multiple, including unity, of the period of a packet.

7. A system according to claim 6 in which said synchronizer includes means operative upon each said resetting of said output address counter to transmit a packet-start pulse.

8. A system according to claim 6 in which said synchronizer includes means operative upon each said resetting of said output address counter, if no packet-start pulse was received since the last resetting of the counter, to transmit an empty packet.

9. A system according to claim 6 in which said synchronizer includes means operative upon each setting of said output address counter, if no packet start pulse was received since the last resetting of the counter, to transmit a packet header signifying that the packet is empty.

10. A system according to claim 6, in which said synchronizer includes means operative between two predetermined counts of said output address counter to transmit guard bits between information bits of successive packets.

* * * * *